No. 624,100. Patented May 2, 1899.
J. A. ROSBACK.
CREAM SEPARATOR.
(Application filed Feb. 1, 1899.)
(No Model.)
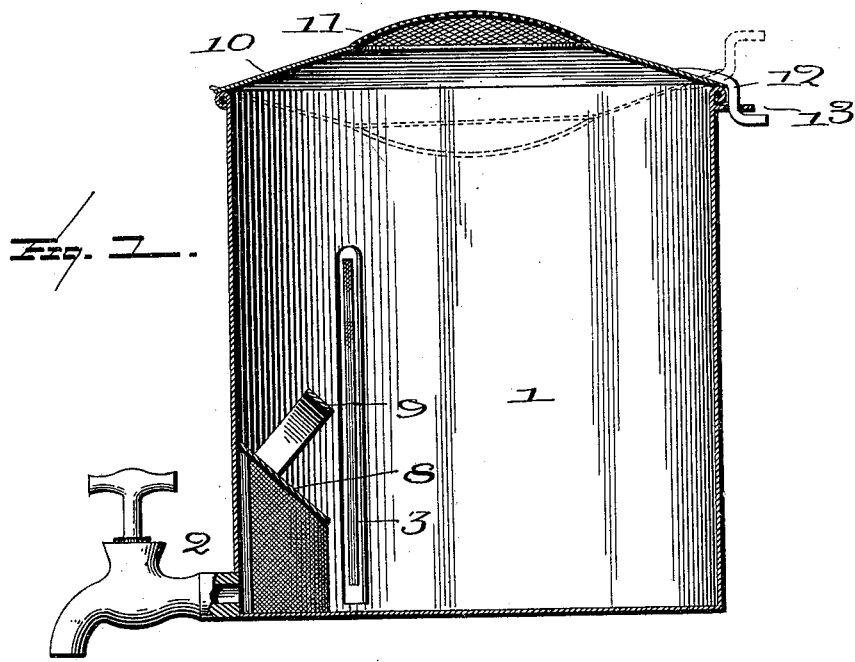
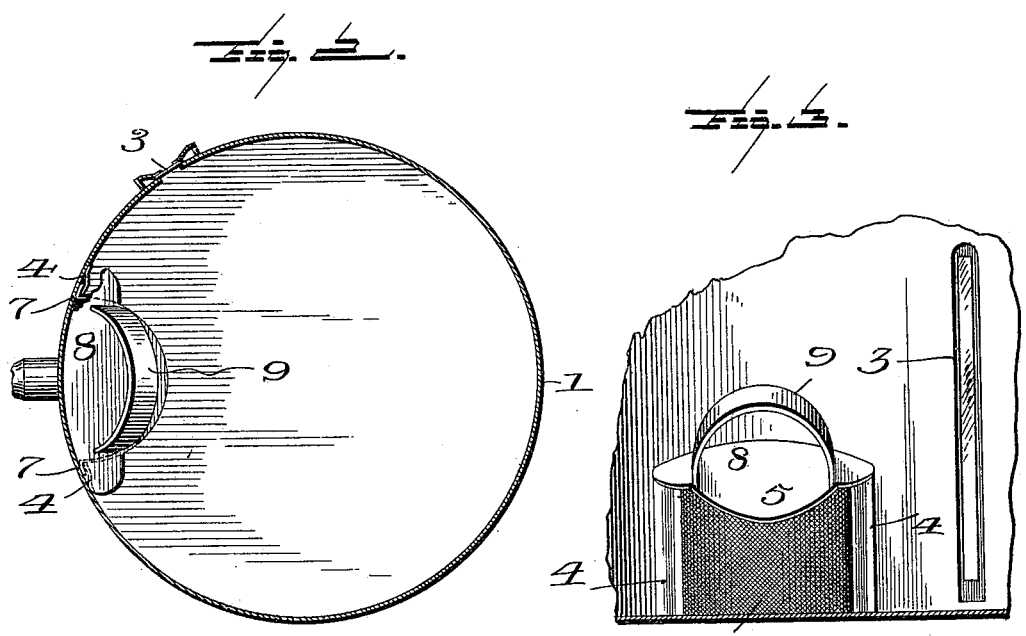
Witnesses:
L. C. Hills,
R. I. C. Caldwell.
Inventor:
Joshua A. Rosback
By Glanrohoco.
Attorneys
THE NORRIS PETERS CO., PHOTO-LITHO., WASHINGTON, D. C.

UNITED STATES PATENT OFFICE.

JOSHUA A. ROSBACK, OF HERMON, NEW YORK.

CREAM-SEPARATOR.

SPECIFICATION forming part of Letters Patent No. 624,100, dated May 2, 1899.

Application filed February 1, 1899. Serial No. 704,201. (No model.)

*To all whom it may concern:*

Be it known that I, JOSHUA A. ROSBACK, a citizen of the United States, residing at Hermon, in the county of St. Lawrence and State of New York, have invented certain new and useful Improvements in Cream-Separators; and I do hereby declare the following to be a full, clear, and exact description of the invention, such as will enable others skilled in the art to which it appertains to make and use the same.

My invention has relation to cream-separators; and it consists in the novel construction and arrangement of its parts, as hereinafter described.

The object of my invention is to provide a simple and cheap device whereby the cream may be easily and readily separated from the milk, and to accomplish this I provide a can with a combination cover and strainer at its top. An equal amount of milk fresh from the cow and fresh cold water is placed in the can. The can is then placed in a cool place and is permitted to stand for a sufficient length of time. The cream will rise to the top, and the milk and water can be drawn off from the bottom of the can through a suitable faucet which is provided. In order to prevent any of the cream from passing out through the faucet, a suitable strainer is provided in the interior of the can and covers the port to the faucet. This strainer is of special construction and can be readily removed for cleaning.

In the accompanying drawings, Figure 1 is a transverse sectional view of the separator. Fig. 2 is a horizontal sectional view of the same. Fig. 3 is a sectional view of a portion of the can, showing the strainer located over the port to the faucet.

The can 1 forms the body of the separator. The faucet 2 is located in the lower portion of the can. The side of the can is provided with a glass-covered aperture 3, through which it can be seen when the cream is separated from the milk. The interior of the can 1 is provided on opposite sides of the port leading to the faucet with the perpendicular guides 4 4. The strainer 5 is provided with the convexed perforated section 6, to the perpendicular edges of which are secured the flanges 7 7, said flanges 7 7 being adapted to pass behind the guides 4 4, and thus hold the strainer in place. The top 8 of the said strainer is imperforated and slanted down at an angle toward the center of the can, thus having a tendency to shunt off any of the liquid which might otherwise adhere to the strainer. The top 8 is also provided with a handle 9, by means of which the strainer may be removed from the can.

The can 1 is provided with a reversible top 10, said top being concavo-convex. The center of the top is provided with the strainer-section 11, and at its edge the said top is provided with a hook 12, the said hook being adapted when the top is in the position as indicated by the heavy lines in Fig. 1 to pass down through the perforated lug 13, attached to the outer side of the can 1. Thus the said hook forms a pivotal point for the cover, and the said cover may be swung to one side or the other without being disengaged from the can. When the top is in the position as shown in the dotted lines in Fig. 1, it is used as a strainer for the milk when it is poured into the can, and while in this position the hook 12 may serve as a handle. It will thus be seen that the top when used as a cover for the can permits the escape of all gases from the interior of the can and at the same time prevents dirt and flies from getting at the contents of the can, thereby insuring cleanliness.

The mode of practicing the invention is as follows: The milk is taken direct from the cow and placed in the can, and an equal amount of fresh cold water is added. The can is then placed in a cool place and is permitted to stand. The cream will rise to the top and the milk and water will settle to the bottom of the can.

Having described my invention, what I claim as new, and desire to secure by Letters Patent, is—

A cream-separator consisting of a can, a faucet located near the bottom thereof, a convexed strainer located over the port to the faucet, the top of said strainer being imperforate and slanting at an angle toward the center of the can.

In testimony whereof I affix my signature in presence of two witnesses.

JOSHUA A. ROSBACK.

Witnesses:
JAS. E. ROBINSON,
A. O. MORGAN.